J. BRITTELL.
VEHICLE WHEEL.
APPLICATION FILED DEC. 8, 1911.
1,049,335.
Patented Jan. 7, 1913.
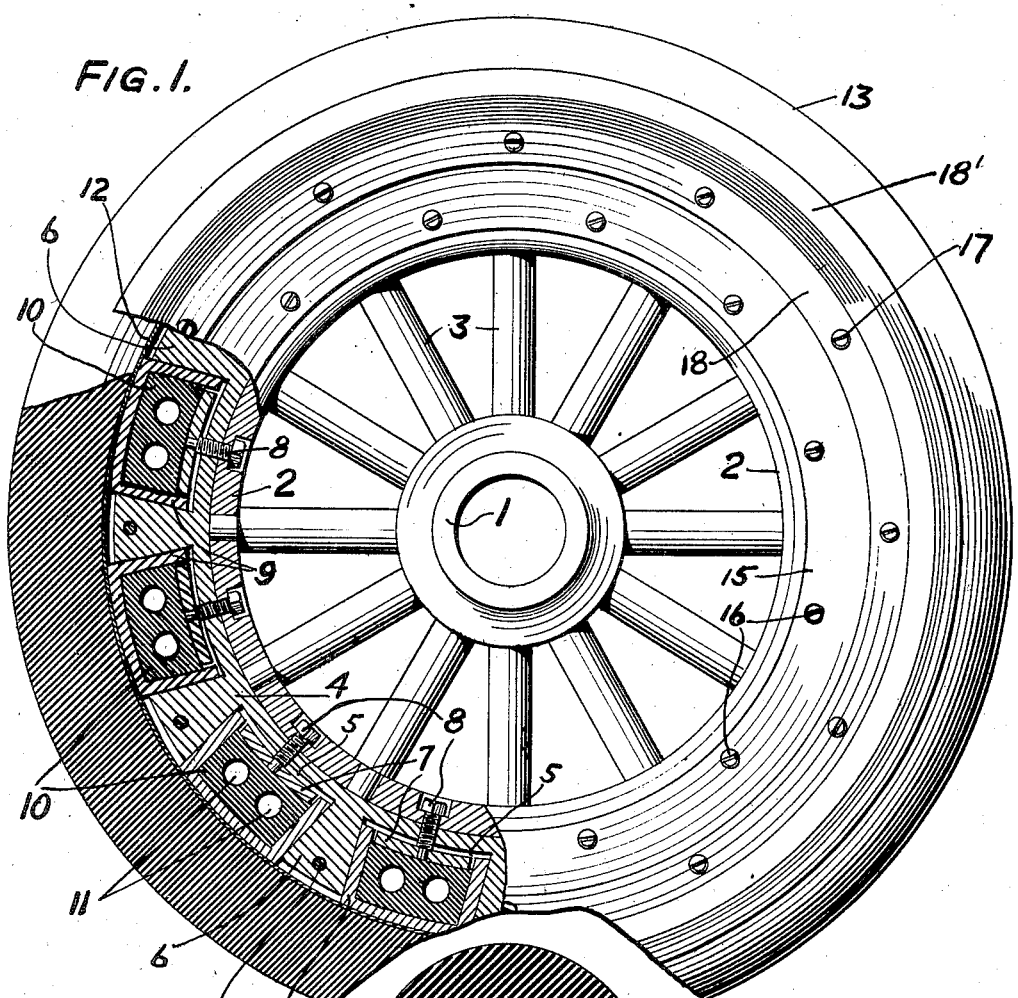
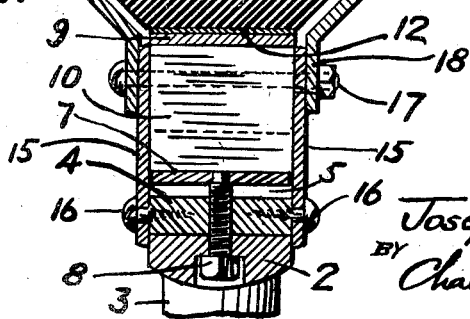

UNITED STATES PATENT OFFICE.

JOSEPH BRITTELL, OF PORT HENRY, NEW YORK.

VEHICLE-WHEEL.

1,049,335.  Specification of Letters Patent.  Patented Jan. 7, 1913.

Application filed December 8, 1911. Serial No. 664,573.

*To all whom it may concern:*

Be it known that I, JOSEPH BRITTELL, a citizen of the United States, residing at Port Henry, in the county of Essex and State of New York, have invented certain Improvements in Vehicle-Wheels, of which the following is a specification.

My invention is designed to provide an improved wheel having a rim comprising peculiar cushioning means whereby the desired resiliency can be obtained with the use of solid rubber tires in a simple, strong and durable construction.

In its preferred form, my invention comprises a wheel having a solid rim containing peripheral recesses, cushions disposed in said recesses, and a rubber tire carried by said cushions.

In the accompanying drawing, Figure 1 is a side elevation, partly in section, of a wheel embracing my improvements; and Fig. 2 is a transverse sectional view through the rim thereof.

The wheel illustrated comprises the usual hub 1 and felly 2 connected by spokes 3. A solid band 4, suitably of metal, is fixed on the felly and has therein the uniformly spaced peripheral recesses 5 separated by the outwardly expanding or wedge shaped band projections 6, the sides of the recesses formed by such sections contracting outwardly. Bearing plates 7 are fixed in the bottoms of the recesses 5 by means of the screws 8 which are set radially in the rim comprising the felly and band, the position of the bearing plates being adjusted by means of the screws. U-shaped casings or boxes 9, open on three sides, are placed in the recesses and rubber blocks 10, preferably having openings 11 therein, are disposed in these casings on the bearing plates 7 which are included within the sides or extensions of the sides of the casings. A flexible band 12, preferably of metal, is supported by the bottoms of the casings 9, which normally lie exterior to the band 4, and a solid rubber tire 13, preferably containing the aperture 14, surrounds and is carried by the band 12. Circular plates 15 are fixed against the sides of the parts 2 and 4, so as to close the ends of the casings 9, by the screws or bolts 16 and 17 set in the parts 4. Circular plates 18, having the offset outer parts 18' for engaging the sides of the tire 13, are fixed to the parts 4 and 15 by the screws or bolts 17.

It will be understood that the substantially vertical force exerted by the load upon the wheel and the counter action due to irregularities in the surface over which the wheel moves will be carried through the cushions comprising the parts 9 and 10, whereby shock and vibrations are absorbed, the holes 11 and 14 of the rubber parts 10 and 13 providing increased elasticity. It will also be understood that the adjustability of the bearing plates 7 permits the blocks 10 and tire 13 to be tightened and the resilience regulated. It will also be understood that the rubber blocks can be replaced readily in case of deterioration or for the purpose of regulating their action to the use or load.

Having described my invention, I claim:

A vehicle wheel comprising a felly, a band surrounding the felly and provided at its outer part with recesses, thrust devices engaging the felly and passing through the band and entering the recesses, plates carried at the outer ends of the said thrust devices, boxes movably mounted in the recesses for movement in radial directions with relation to the wheel and having their outer portions projecting beyond the outer periphery of the band, said boxes slidably receiving said plates, resilient members located in the boxes and bearing against the inner surfaces of the outer sides thereof and the outer surfaces of the plates, a resilient band bearing against the outer portions of the boxes and spaced by the boxes from the outer surface of the said recessed band surrounding the felly and a tire or tread mounted upon the last mentioned band.

In witness whereof I have hereunto set my name this 1" day of December, 1911, in the presence of the subscribing witnesses.

JOSEPH BRITTELL.

Witnesses:
A. C. LINDIN,
C. J. MAYE.